(12) United States Patent
Curtis

(10) Patent No.: US 8,095,485 B2
(45) Date of Patent: Jan. 10, 2012

(54) SYSTEM AND METHOD FOR EMBEDDING EMOTION IN LOGIC SYSTEMS

(75) Inventor: Steven A. Curtis, Dayton, MD (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 549 days.

(21) Appl. No.: 12/353,637

(22) Filed: Jan. 14, 2009

(65) Prior Publication Data
US 2010/0179671 A1  Jul. 15, 2010

(51) Int. Cl.
*G06E 1/00* (2006.01)
(52) U.S. Cl. .......................................... 706/15
(58) Field of Classification Search .............. 706/12
See application file for complete search history.

*Primary Examiner* — Michael B Holmes
*Assistant Examiner* — Ababacar Seck
(74) *Attorney, Agent, or Firm* — Matthew F. Johnston

(57) ABSTRACT

A system, method, and computer readable-media for creating a stable synthetic neural system. The method includes training an intellectual choice-driven synthetic neural system (SNS), training an emotional rule-driven SNS by generating emotions from rules, incorporating the rule-driven SNS into the choice-driven SNS through an evolvable interface, and balancing the emotional SNS and the intellectual SNS to achieve stability in a nontrivial autonomous environment with a Stability Algorithm for Neural Entities (SANE). Generating emotions from rules can include coding the rules into the rule-driven SNS in a self-consistent way. Training the emotional rule-driven SNS can occur during a training stage in parallel with training the choice-driven SNS. The training stage can include a self assessment loop which measures performance characteristics of the rule-driven SNS against core genetic code. The method uses a stability threshold to measure stability of the incorporated rule-driven SNS and choice-driven SNS using SANE.

20 Claims, 3 Drawing Sheets

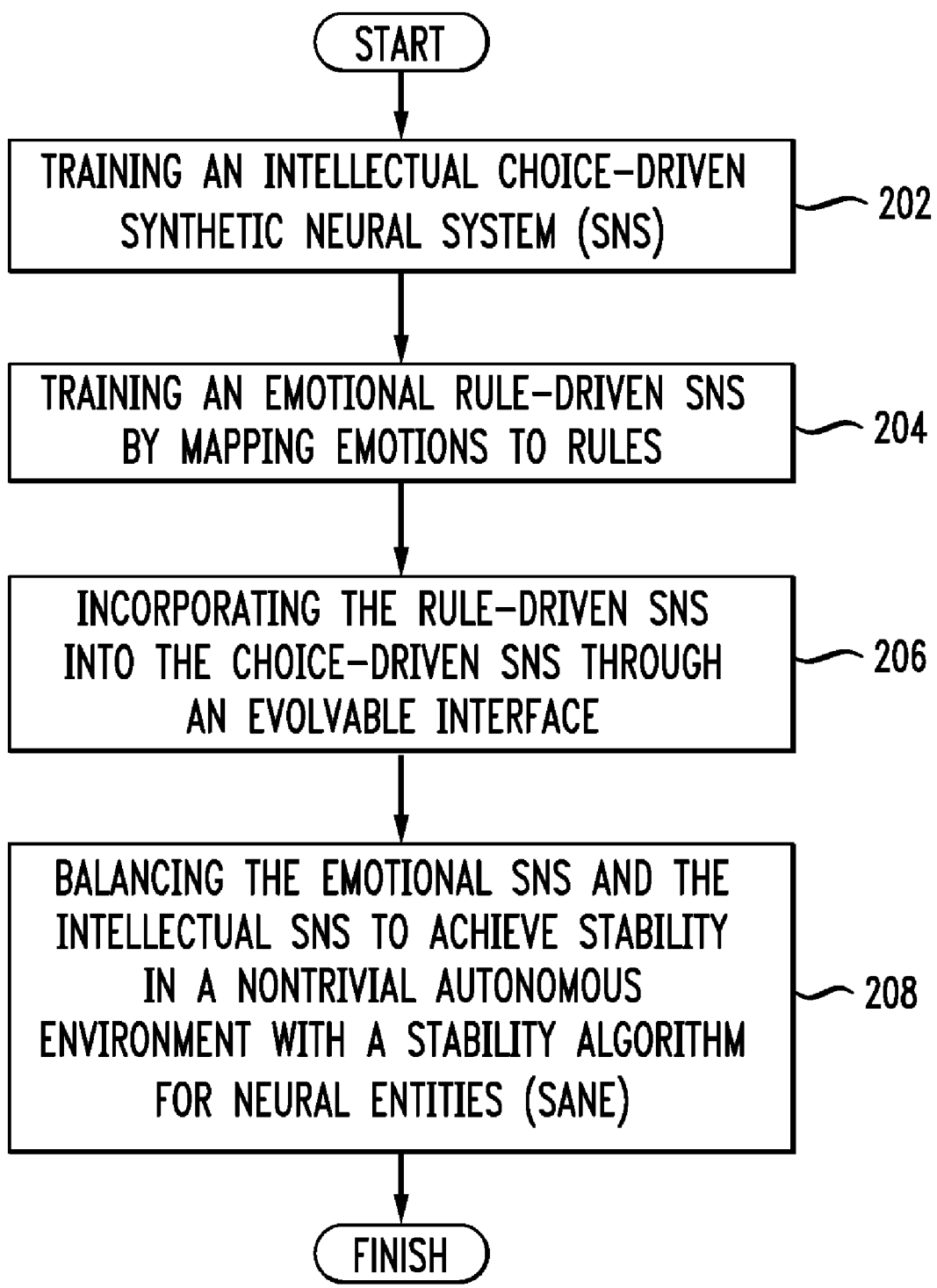

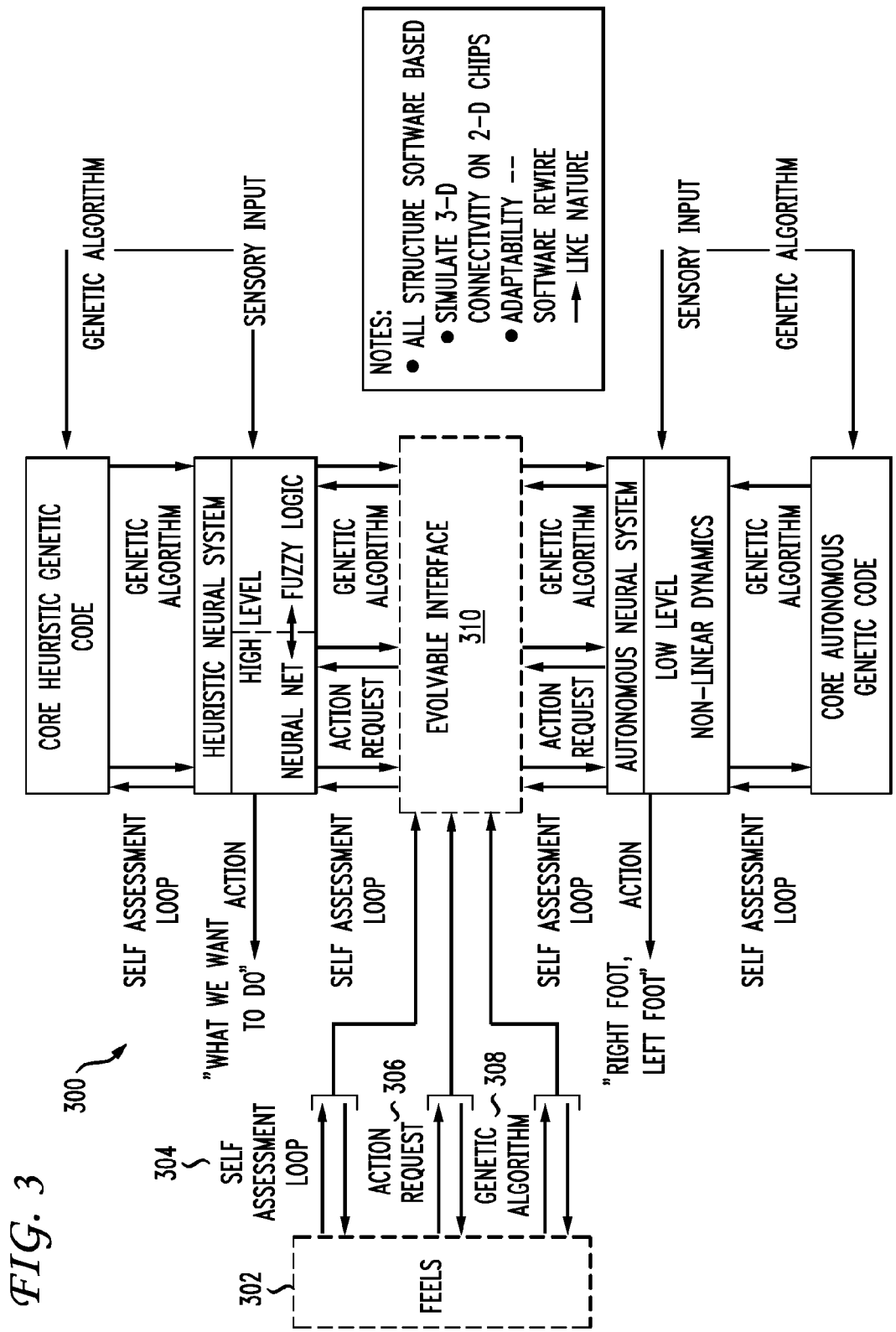

SYSTEM AND METHOD FOR EMBEDDING EMOTION IN LOGIC SYSTEMS

ORIGIN OF THE INVENTION

The invention described herein was made by an employee of the United States Government and may be manufactured and used by or for the Government for governmental purposes without the payment of any royalties thereon or therefore.

CROSS-REFERENCE TO RELATED APPLICATIONS

This application relates to application Ser. No. 11/861,687 filed Sep. 26, 2007, entitled "System and Method for Determining Stability of a Neural System"; U.S. Publication 2005/0240542A1, application Ser. No. 11/109,400 filed Apr. 8, 2005 entitled "Evolvable Synthetic Neural System,"; and U.S. Publication No. 2005/0247144A1, application Ser. No. 11/108,627 filed Apr. 8, 2005 entitled "Reconfigurable Structure," the entire disclosures of which are hereby incorporated herein by reference in there entirety.

BACKGROUND OF THE INVENTION

1. Field of the Invention

The present invention relates to neural networks and more specifically to generating stable neural networks for autonomous use in nontrivial environments.

2. Introduction

Neural systems are mathematical or computational models consisting of an interconnected group of nodes, otherwise known as neurons or simple processing elements, which process information in a connectionist approach. Some neural systems may be constructed so as to adapt their structure based on internal or external factors. In order to create a neural system that demonstrates reasonable behavior, the neural system must have a certain level of complexity, but that complexity is difficult to maintain in a stable form. In humans, additional complexity without stability manifests itself in the form of psychological conditions or tendencies, such as Narcissistic Entitlement Syndrome, overly perfectionist tendencies, etc. This is characterized by having too many choices and too few rules to truncate a continuing search for a better or more perfect solution. At the opposite end of the psychological spectrum, there are too many rules with too few choices, resulting in sociopathic tendencies owing to over certainty in solutions and discarding and devaluing the input and value of others. In machines, additional complexity without stability leads to all sorts of behavior analogous to human psychological defects in its internal interactions with various subsystems as well as its interactions with its environment and/or peers.

One existing approach is to create a purely rule-driven system, but rule-driven, or reflexive, sociopathic trend (emotionally dominant) systems almost invariably encounter exceptions to the established set of rules and are quickly perturbed by these exceptions and variations. Another approach is to create a purely choice-driven system, which is narcissistic trend (intellectually dominant) and becomes overburdened by too many choices. Both of these approaches cannot provide a stable synthetic neural system for any non-trivial autonomous environment. A robot on an assembly line is one example of a trivial autonomous environment based on a rule-driven system. The robot is able to quickly perform a set task given set inputs. For example, if the input changes, the robot's location changes, or the robot's abilities are hindered (such as by a malfunction) the robot is unable to autonomously cope with these changes and requires human intervention.

One approach in prior art systems provides a rigorous approach to neural system stability analysis, attempting to catalog every possible state in a given neural system, but that results in a prohibitively high number of states if the system is not constructed with stability as an architectural driver from the beginning. Such systems often include requirements to identify unstable interactions between elements of neural systems and to provide guidance on their correction.

Another prior art approach can be labeled "progressive mimicry". Rather than understanding and duplicating the thought process and reflexive behaviors behind human actions, progressive mimicry is the process of copying the external manifestations of the thought process and reflexive behaviors driving human actions. Essentially, this approach attempts to copy human behavior rather than independently generating behavior. Copying the actions and mannerisms of another is not autonomous behavior. Such a system can only duplicate what it knows. Complexity is fundamental to any form of true autonomy.

Accordingly, what is needed in the art is an improved way of generating stable neural systems for use in non-trivial autonomous environments.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, methods, and tangible computer readable-media for creating a stable synthetic neural system. The method includes training an intellectual choice-driven synthetic neural system (SNS), training an emotional rule-driven SNS by generating emotions from rules, incorporating the rule-driven SNS into the choice-driven SNS through an evolvable interface, and balancing the emotional SNS and the intellectual SNS to achieve stability in a nontrivial autonomous environment with a Stability Algorithm for Neural Entities (SANE). Generating emotions from rules can include coding the rules into the rule-driven SNS in a self-consistent way. Training the emotional rule-driven SNS can occur during a training stage in parallel with training the choice-driven SNS. The training stage can include a self assessment loop which measures performance characteristics of the rule-driven SNS against core genetic code. The method can use a stability threshold to measure stability of the incorporated rule-driven SNS and choice-driven SNS using SANE. Emotions derive directly from rules governing which stimulus leads to which output.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which:

FIG. 2 illustrates an example method embodiment; and

FIG. 3 illustrates an example neural map for a neural basis function of a synthetic neural system which is one node of a multi-node neural system which includes Formulation for Emotion Embedding in Logic Systems (FEELS) at each such node.

DETAILED DESCRIPTION

Figure 1:
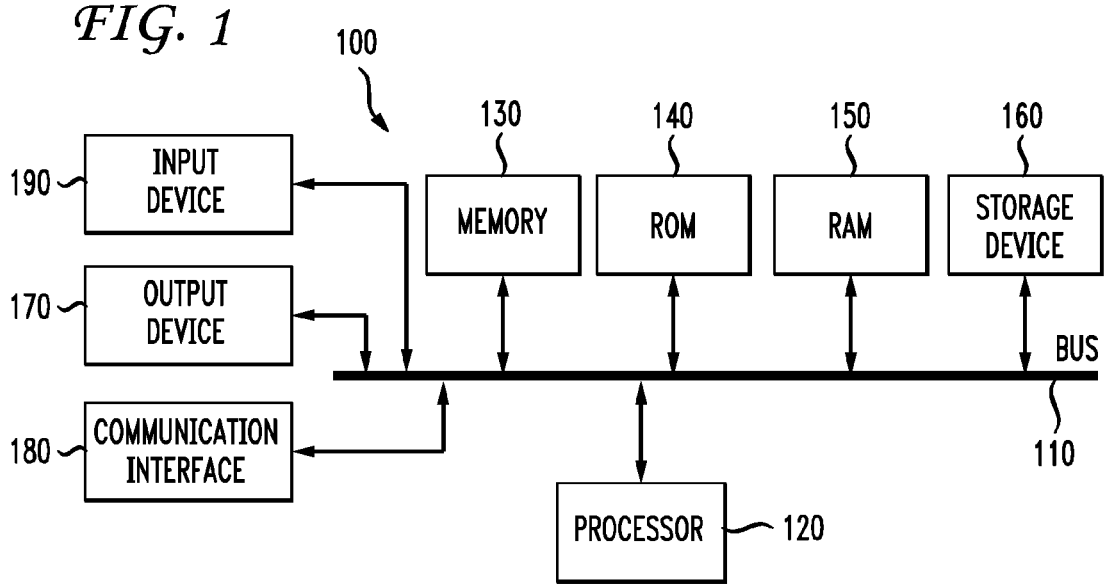
FIG. 1 illustrates an example system embodiment.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. An Intel Xeon LV L7345 processor is an example of a general purpose CPU which is controlled by software. Particular functionality may also be built into the design of a separate computer chip. An STMicroelectronics STA013 processor is an example of a special-purpose processor which decodes MP3 audio files. Of course, a processing unit includes any general purpose CPU and a module configured to control the CPU as well as a special-purpose processor where software is effectively incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Having discussed some fundamental system elements, the disclosure turns to the exemplary method embodiment. The method builds on the recognition that rules can represent emotions and that rules must be implemented in any kind of autonomous system to have a stable, useful machine. Emotions are rules. An example rule "don't get too close to the cliff edge" equates to the emotion of fear. However emotions in these general terms are not meaningful for constructing neural systems which are, in part, the sum of many rules. Some rules can be broadly classified as kinds of emotions.

Autonomous systems do not really feel "fear" as much as they follow the rule that yields the behavior. For autonomous systems, creators do not specify emotions and then map them to rules, rather creators develop rules for these systems and these rules constitute the emotional structure for the autonomous systems. For an entity operating using the principles described herein, an external observer may see what appears to be a display of fear, but the quantitative underlying functions are essentially a collection of rules.

Similarly, intellectual processes are choices. Two fundamentally simple processes underlie all the system-level complexities of human behavior and animal behavior: rules and choices. This understanding allows a quantitative approach to problems. That is to say that psychology can be quantified for both machines and humans. In the case of human psychology the principles described herein allow for curative rather than palliative treatment. In the case of autonomous machines, the principles described herein enable constructing machines with psychologically stable autonomous behaviors in complex environments.

The disclosure describes the method embodiment in terms of a system configured to practice the method. FIG. 2 illustrates an example method embodiment for creating a stable synthetic neural system. The system trains an intellectual choice-driven synthetic neural system (SNS) (202). FIG. 2 illustrates the method for creating a single node of a synthetic neural system which can contain multiple nodes. Each node can start in a primitive state characterized by core genetic code specifying the desired functions and capabilities of this node. Starting with a very threadlike structure characterized by a simply specifying a first guess derived from the core genetic code, nodes can train by repeatedly advancing their respective structures using genetic algorithms and selecting the form that produces the behavior closest to the desired behavior at each step, as indicated by the self assessment loop. Nodes repeat this process until they achieve convergence to the desired behavior.

The system also trains an emotion/rule-driven SNS (204). The system can train an emotion/rule-driven SNS by specifying an initial, simple set of rules that roughly governs the desired behavior and iterating the rules through the same steps as the intellectual choice driven component while using SANE to maintain a psychologically stable behavior for that node. The developed rule set can constitute the emotional structure for that node. Since most SNSs of any useful proportion contain a plurality of nodes, the system can employ a similar iterative approach on a multi-node level in order to obtain the desired total stable behavior characteristics for the SNS. A plurality of connected nodes forming an SNS can communicate via wired and/or wireless connections and may function in a peer to peer form, a more hierarchical, authoritarian form where one or more nodes are "in charge" and make larger decisions, instructing the follower nodes to carry out those decisions autonomously. A group of SNSs can form a collective whole that is also properly termed an SNS. The system can construct emotions-generating rules governing which stimulus leads to which output. The system can train the emotional rule-driven SNS during a training stage in parallel with training the choice-driven SNS. The system can use this co-evolution between the rule-driven SNS and the choice-driven SNS to achieve a high degree of stability. Although the disclosure discusses one rule-driven SNS and one choice-driven SNS explicitly, the principles of the invention can be applied to a system having multiple rule-driven SNSs and/or multiple choice-driven SNSs, so long as they are stable or substantially stable in combination. The training stage can include a self assessment loop which measures performance characteristics of the rule-driven SNS against core genetic code. A genetic algorithm can perform a Darwinian selection between potential architectures during an evolving/training stage to see which ones work best by stepping through multiple options and iteratively coming up with a successful design.

The system incorporates the rule-driven SNS into the choice-driven SNS through an evolvable interface (206). The system balances the emotional SNS and the intellectual SNS to achieve stability in a nontrivial autonomous environment with a Stability Algorithm for Neural Entities (SANE) (208). The system can measure the stability of the incorporated rule-driven SNS and choice-driven SNS by a stability threshold using SANE. In general the system can establish thresholds by determining if a small change in a given psychological element can produce a large change in another, in the overall state of the system, or in the sensitivity to both external and internal environment changes. Such large changes can give rise to instability, as determined by SANE. One of SANE's goals can be to reduce the risk of psychological instability by ensuring that all changes be of the same size. For example, a small rule change which leads to a large change in the choice can lead to instability, and a small change in choices which produces a large rule change can lead to instability. The system can determine its choice and rule components based on the need to avoid these instabilities which SANE can flag.

FIG. 3 illustrates an example of a neural basis function of a synthetic neural system constructed from a neural basis function node which includes a Formulation for Emotion Embedding in Logic Systems (FEELS) 302. FIG. 3 demonstrates a Synthetic Neural System (SNS) Neural Basis Function (NBF) showing inclusion of an adaptive and evolutionary FEELS module attached to the NBF via an Evolvable Neural Interface (ENI) 310. In general, a synthetic neural system includes multiple neural basis functions (NBF) interconnected through one or more ENIs. Additional NBFs may be stable in and of themselves but their interactions with other NBFs must not drive the system to instability. The three time scales relevant to SANE are (1) reactive time scales of the applied internal and external perturbations, (2) adaptation time scales over which it takes the genetic algorithms to advance the ENI, the low level neural system, and the high level neural system, and (3) evolutionary time scales needed for the genetic algorithms to evolve the core genetic codes of the low level neural system and the high level neural system.

While most synthetic neural systems generally follow the time scale ordering of a natural neural system (reactive being shorter than adaptive, which is shorter yet than evolutionary), a synthetic neural system with sufficient computational bandwidth can collapse all three time scales down to comparable values. With the ability to collapse multiple time scales, synthetic neural networks may achieve neural shape shifting. If a neurally shape-shifting synthetic neural system is embedded in a physically shape shifting mobile architecture, extremely plastic behavior is possible. However, such a neurally shape-shifting neural system must be psychologically stable to be useful. To ensure stability, some psychological stability algorithm is needed, such as SANE used in combination with FEELS.

There is no guarantee that neural systems, either natural or synthetic are stable. The related patent application titled "System and Method for Determining Stability of a Neural System" develops and describes a stability algorithm, SANE, which, when infused into the training of a neural system, identifies the development of necessary conditions for unstable behavior as determined by SANE and as discussed above. When applied to natural neural systems (NNS) such as humans, SANE dictates that intellectual and emotional psychological elements must balance in order to achieve neural system stability in a wide variety of environments. Most synthetic neural systems (SNS), such as the SNS—Neural Basis Function (NBF) have no explicit emotional elements, making them intellectually dominant and unstable.

Intellectual systems are choice driven, whereas emotional systems are rule driven and devoid of choice. FIG. 3 illustrates how the SNS-NBF 300 can incorporate emotions through a rule driven node labeled FEELS 302. A substantial portion of FIG. 3 is duplicated from FIG. 6 of the incorporated application and is discussed therein. Those portions are not discussed in depth in this application. This application focuses on discussing the new parts of FIG. 3. The FEELS node 302 can have similar adaptive and evolutionary capability to the heuristic and autonomic nodes of the standard SNS-NBF 300. During training, the rule-driven system develops along with the heuristic and autonomic components such that the SANE stability criteria are satisfied for all psychological elements of the system. One way to accomplish this is to incorporate a self assessment loop 304 between FEELS 302 and the evolvable interface 310. The self assessment loop serves to provide feedback to measure performance characteristics of FEELS 302, or the rule-driven SNS, against a core genetic algorithm 308. During typical operation, FEELS 302 and the evolvable interface 310 communicate via action requests 306. In this manner, the rule-driven components and the choice-driven components coordinate and blend with each others' strengths to provide a stable whole. The FEELS-enhanced SNS-NBF is free or substantially free from emotional and intellectual instabilities.

Rule-driven systems are unstable in a nontrivial autonomous environment because they are emotion dominant, much like intellect-driven SNSs are unstable because they are choice dominant. FEELS provides a way of combining intellectual and emotional systems which are separately unstable into a stable whole. In other words, FEELS provides a way to incorporate emotions that are rules into machine intelligence, and, in doing so, make a stable SNS.

This disclosure builds on the NBF SNS in that SNS provides the basis for or an example of an emotion interface. This disclosure provides a specific methodology to implement emotions into neural systems as a prerequisite for neural system stability in a non-trivial environment. This methodology can stably incorporate rules as emotional elements.

Evolutionary, in terms of SNS development, refers to the implementation stage of the core genetic code, as discussed in the related application regarding NBF SNS. The process of evolution is analogous to embryonic development. However, like the embryo, the SNS core genetic code does not change. Rather, it proceeds through a series of developmental steps to reach the desired level of complexity and/or maturity. Developmental changes in the core genetic code/algorithm can give rise to evolution. Such evolution can be a path to evolutionary change in the SNS to account for external changes, such as a changing environment or a changing objective, or internal changes, such as structural damage or reduced functionality. Evolutionary change can be one attribute of an advanced stable neural system.

Simple incarnations of this neural architecture are primarily reactive, like most people in day-to-day life. More advanced forms are adaptive, like a group of people adjusting to large changes over extended periods. The most advanced forms are evolutionary, meaning that they are able to make fundamental changes to their behavior, like many generations of people facing large changes over time. Such fundamental changes can occur gradually or over a very short period of time. In the latter case, for natural neural systems such as humans, the change is accommodated through the diversity of systems across a population, allowing at least some fraction to continue successfully. For machines, however, with a population as small as one, the time scale collapse discussed earlier is the pathway for survival of the individual.

As stable neural systems develop and grow in complexity, managing them becomes more difficult. An administrator can not simply change a line of code to alter behavior of a neural system as is possible with a traditional software application. Further, these neural systems, if unstable, can develop certain types of neuroses, similar to humans. For example, an SNS that is rule-heavy operates on a sociopathic trend, while an SNS that is intellect-heavy operates on a narcissistic trend. A successful SNS needs to be responsive, but not too responsive. From a SANE perspective, the Psychological State Vector (PSV) requires a certain level of mobility to produce useful behavior. However, hyper mobility yields instability. Hence, psychological instability, whether for natural or synthetic neural systems, is the result of an overdevelopment of a needed response behavior. Despite the rather large differences between the actual hardware used to implement SNSs and the wetware used to implement human neural networks (i.e. the human brain and nervous system), the FEELS principles are fundamentally applicable to both. FEELS principles can aid in understanding and possibly even correcting both human and SNS psychology flaws. One advantage of an SNS is that a user can control the source code, the initial architecture, and the entire training process directly to avert potential psychological flaws in the future.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the principles herein may be applied to spacecraft operating millions of miles from Earth in unexpected and unplanned environments or to more terrestrial robots in dynamic, nontrivial environments. Those skilled in the art will readily recognize various modifications and changes that may be made to the present invention without following the example embodiments and applications illustrated and described herein, and without departing from the true spirit and scope of the present invention.

I claim:

1. A method of creating a stable synthetic neural system, the method comprising:
   providing least one processor executing program code to control an action in response to sensory input data, said program code including the steps of:
   establishing an intellectual choice-driven synthetic neural system (SNS);
   training said intellectual choice-driven SNS;
   establishing an emotional rule-driven SNS;
   training an emotional rule-driven SNS;
   incorporating said rule-driven SNS into said choice-driven SNS through an evolvable interface; and
   balancing said emotional SNS and said intellectual choice-driven to provide system stability.

2. The method of claim 1, wherein training the emotional rule-driven SNS includes:
   generating rules that are emotions; and
   coding the rules into the rule-driven SNS in a self-consistent way.

3. The method of claim 1, wherein training the emotional rule-driven SNS occurs during a training stage in parallel with training the choice-driven SNS.

4. The method of claim 3, wherein the training stage includes a self assessment loop which measures performance characteristics of the rule-driven SNS against core genetic code.

5. The method of claim 1, wherein stability of the incorporated rule-driven SNS and choice-driven SNS is measured by a stability threshold.

6. The method of claim 1, wherein emotions are rules governing which stimulus leads to which output.

7. A stable synthetic neural system, the system comprising:
   at least one processor executing program code, said program code including
   an intellectual choice-driven synthetic neural system (SNS) module to control a device in response to sensory input data;
   an emotional rule-driven SNS module generating emotions based rules;
   an evolvable interface module configured to incorporate the emotional rule-driven SNS module into the choice-driven SNS module; and
   a stability module configured to balance the rule-driven SNS module and the choice-driven SNS module to achieve stability in a nontrivial autonomous environment.

8. The system of claim 7, wherein the rule-driven SNS module maps emotions by coding the rules into the rule-driven SNS module in a self-consistent way.

9. The system of claim 7, wherein the rule-driven SNS module is trained during a training stage in parallel with training the choice-driven SNS module.

10. The system of claim 9, wherein the training stage includes a self assessment loop which measures performance characteristics of the rule-driven SNS module against core genetic code.

11. The system of claim 7, the system further comprising a module configured to measure the stability of the incorporated rule-driven SNS module and choice-driven SNS module based on a stability threshold using SANE.

12. The system of claim 7, wherein the rule-driven SNS module generates rules which are emotions governing which stimulus leads to which output.

13. A tangible computer-readable medium having executable instructions to create a stable synthetic neural system, the executable instructions comprising:
   training an intellectual choice-driven synthetic neural system (SNS);
   training an emotional rule-driven SNS by generating rules which are emotions;
   incorporating the rule-driven SNS into the choice-driven SNS through an evolvable interface; and
   balancing the emotional SNS and the intellectual SNS to achieve stability in a nontrivial autonomous environment with a Stability Algorithm for Neural Entities (SANE).

14. The tangible computer-readable medium of claim 13, wherein training an emotional rule-driven SNS includes: generating emotions from rules; and coding the rules into the rule-driven SNS in a self-consistent way.

15. The tangible computer-readable medium of claim 13, wherein training the emotional rule-driven SNS occurs during a training stage in parallel with training the choice-driven SNS.

16. The tangible computer-readable medium of claim 15, wherein the training stage includes a self assessment loop which measures performance characteristics of the rule-driven SNS against core genetic code.

17. The tangible computer-readable medium of claim 13, wherein stability of the incorporated rule-driven SNS and choice-driven SNS is measured by a stability threshold using SANE.

18. The tangible computer-readable medium of claim 13, wherein emotions are generated by rules governing which stimulus leads to which output.

19. A computer-accessible medium having executable instructions, the computer-accessible medium comprising:
   at least one intellectual choice driven synthetic neural system (SNS) function controlling an action of a robotic device in response to sensory input data;
   an emotional rule-driven SNS module generating emotions based rules; and
   a first evolvable neural interface operably coupled to said at least one intellectual choice driven synthetic neural system and said emotional rule-driven SNS to selectively establish communication therebetween and incorporating said emotional rule driven SNS into said sat least one intellectual choice driven SNS.

20. The computer-accessible medium according to claim 19, further comprising:
   a stability module provided to stabilize said at least one intellectual choice driven SNS incorporated with said emotional rule driven SNS.

* * * * *